United States Patent Office 3,551,218
Patented Dec. 29, 1970

3,551,218
FLUX FOR WELDING TITANIUM AND ITS ALLOYS
Samuil Mordkovich Gurevich, Kiev, U.S.S.R., assignor to Institut Elektrosvarki Im E. O. Patona, Kiev, U.S.S.R.
No Drawing. Filed Dec. 22, 1967, Ser. No. 692,651
Int. Cl. B23k 35/34
U.S. Cl. 148—26                                                     4 Claims

ABSTRACT OF THE DISCLOSURE

A flux for welding titanium and its alloys is provided. The flux contains at least 77.5% by weight of $CaF_2$ and may additionally contain varying amounts of NaF, $BaCl_2$ and NaCl.

---

The present invention relates to fluxes for welding, and more particularly to fluxes for welding titanium and its alloys.

The invention may be used to its best advantage when effecting the automatic welding of titanium and its alloys.

Known fluxes, which are used for welding steel and other metals, having in their composition oxides of metals and nonmetals (CaO, MgO, $SiO_2$, etc.), cannot be used for welding titanium and its alloys because of the high activity of titanium in relation to oxygen. A welded joint, made under fluxes containing oxides, is characterized by a high degree of brittleness, and it is therefore liable to crack immediately after welding.

At the present time, the welding of titanium and its alloys is effected under a protective atmosphere of an inert gas, such as argon, helium or a mixture thereof.

The process of welding titanium and its alloys, under a protective atmosphere of inert gases, presents a number of disadvantages from the point of view of welding technique. The welding must be carried out in closed rooms where air currents are totally absent. An additional protection of the surface of a cooling portion of the welded joint by means of an inert gas is thereby required. The welding of thick articles (10 to 20 mm.) must be effected by the multiple deposition of seams over the joint being welded.

It is an object of the present invention to eliminate the above-said disadvantages.

Another object of the present invention is to provide such a flux for welding titanium and its alloys, which provides for a high quality of the obtained welded joint through the application of a simple welding process.

A further important object of the present invention is to provide a similar flux permitting the welding to be effected under erection conditions in open working areas.

In conformity with these and other objects, the flux for welding titanium and its alloys according to the invention comprises calcium fluoride, $CaF_2$.

In addition to calcium fluoride ($CaF_2$), the flux may also comprise sodium fluoride (NaF). In this case, it is expedient that the amount of sodium fluoride be equal to 0.5 to 1.5 percent by weight.

A favorable solution of the above problem can be achieved as a result of the fact that in addition to calcium fluoride ($CaF_2$) and sodium fluoride (NaF), the present flux further comprises barium chloride ($BaCl_2$).

In this case, it is the most advantageous that the flux contains (in wt. percent):

Calcium fluoride ($CaF_2$) _____ 77.5–94.5
Sodium fluoride (NaF) _____ 0.5–1.5
Barium chloride ($BaCl_2$) _____ 5.0–21.0

If it is required to effect X-ray inspection of the welded joint, then it is expedient that the flux prepared on the basis of calcium fluoride ($CaF_2$) should further comprise sodium chloride (NaCl), preferably in an amount from 1 to 5 percent by weight.

The proposed flux for welding titanium and its alloys ensures a high quality of the welded joint when simple welding is effected.

The nature of the present invention will become more fully apparent from a consideration of the following description of exemplary embodiments thereof, taken in conjunction with the attached tables, in which:

Table 1 is characteristic of the flux welding properties;
Table 2 is characteristic of the mechanical properties of the base metal and the weld metal.

TABLE 1

| Serial number | Composition of flux, in wt. percent | Rate of welding, m./hr. | Welding current, amps | Welding arc voltage, v. | Characteristics of the flux welding properties |
|---|---|---|---|---|---|
| 1 | 2 | 3 | 4 | 5 | 6 |
| 1 | $CaF_2$—100 | 50 | 360–380 | 35–36 | Stable welding process. Good building up of a seam and slag crust. Dark surface of the seam. |
| 2 | $CaF_2$—99.5 / NaF—0.5 | 50 | 360–380 | 35–36 | As in the Example 1. There is observed the trend to refining of the welding seam macrostructure. |
| 3 | $CaF_2$—95.8 / NaF—1.5 | 50 | 360–380 | 35–36 | As in Example 2. A more refined welding seam structure. |
| 4 | $CaF_2$—98.0 / NaF—2.0 | 50 | 360–380 | 35–36 | As in the Example 2. No further refining of the macrostructure is observed. |
| 5 | $CaF_2$—93.5 / NaF—1.5 / $BaCl_2$—5.0 | 50 | 360–380 | 35–36 | Stable welding process. Good building up of the welding seam and slag crust. Easy separation. A lighter surface of the welding seam than that of the Example 1. |
| 6 | $CaF_2$—80.5 / NaF—1.5 / $BaCl_2$—18.0 | 50 | 360–380 | 35–36 | Possesses good welding properties. A smooth and light surface of the welding seam. |
| 7 | $CaF_2$—87.5 / NaF—1.5 / $BaCl_2$—11.0 | 50 | 360–380 | 35–36 | As in the Example 5. The flux possesses a lower melting point. A deterioration of the building up of the slag crust is observed as the current density increases during the welding process. |
| 8 | $CaF_2$—99.0 / NaCl—1.0 | 50 | 360–380 | 35–36 | Stable welding process. Good building up of the welding seam and slag crust. Easy separation. In some places, the welding seam has the grey surface. |
| 9 | $CaF_2$—98.0 / NaCl—2.0 | 50 | 360–380 | ---------- | As in the Example 6. |
| 10 | $CaF_2$—95.0 / NaCl—5.0 | 50 | 360–380 | 35–36 | As in the Example 8. A greater degree of fusion of the slag crust is observed during the welding process that that stated in the Example 9. |

TABLE 2

| Metal to be tested | Yield point, jkg./mm.² $\sigma s$ | Ultimate strength, kg./mm.² $\sigma b$ | Elongation, percent, $\delta$ | Contraction, percent | Resistance to impact bending strength, $a_k$, kg.m/cm.² |
| --- | --- | --- | --- | --- | --- |
| Sheet titanium (commercial) | 37–39 | 42–45 | 28–30 | 40–45 | 18–20 |
| Welding seam metal | 38–40 | 43–46 | 25–29 | 35–40 | 16–17 |

In conformity with the invention, the flux for welding titanium and its alloys comprises calcium fluoride, $CaF_2$. Calcium fluoride is neutral from the metallurgical point of view in relation to such a highly active metal as titanium. Moreover, the presence of dissociated fluorine in the process of metallurgical action upon the molten metal contributes to binding hydrogen being a harmful impurity for titanium, thus decreasing its content in titanium.

For effecting automatic welding, it is expedient that in addition to calcium fluoride the flux contain sodium fluoride, NaF. The content of sodium fluoride in a proportion of 0.5 to 1.5 percent by weight contributes to refining the macrostructure of the welding seam metal owing to a vigorous modifying action of sodium. The best modifying action of sodium is observed when the addition of sodium fluoride amounts to 1.5 percent by weight. A further increase in the proportion of sodium fluoride is likely to impair the welding properties of the flux by decreasing its melting point and increasing the slag fluidity.

Table 1 is characteristic of the welding properties of the flux.

As has been shown by experimental testing, the presence of chlorides in the flux permits an increase in welding properties of the flux when welding titanium. Thus, the content of barium chloride ($BaCl_2$) in the flux amounting to about 5 to 21 percent by weight contributes to an improvement in the welding seam surface, rendering it smooth and of a light color, which also is conducive to a better separation of the slag crust from the welding seam surface.

The flux containing sodium fluoride (NaCl) in a proportion up to 5 percent by weight combined with calcium fluoride ($CaF_2$) presents good welding properties when employed in the welding process. The best characteristics of these properties were obtained when the proportion of sodium chloride amounted to 2 percent by weight, the remainder being constituted by calcium fluoride. The use of such a flux for welding titanium allows X-ray inspection of the welded joints to be successfully employed. The welding of titanium under fluxes of the optimum composition allows obtaining of high-quality welded joints whose mechanical properties are not inferior to those of the metal being welded.

Table 2 presents the mechanical properties of the metal being welded and those of the weld metal obtained during the automatic welding under flux according to its optimal embodiments (see, for example, Examples 6 and 9 as shown in Table 1).

The welding of titanium under flux may be effected under erection conditions in open shop areas and on construction sites, for the welding arc zone and the welding pool are reliably protected by the flux layer against the action of air currents. There is also eliminated the necessity of providing an additional light screening, protecting the surrounding personnel against harmful ultra-violet radiation of the welding arc. To weld such a highly active metal as titanium requires the indispensable protection of the surface of the cooling portion of the welding seam against its saturation with gases from the surrounding atmosphere. This task is successfully performed by the slag crust as formed on the welding seam surface during the flux melting. With the use of any of the most advanced methods of argon-arc welding of titanium, automatic welding under flux presents the greatest advantages because it allows a considerable reduction in the time of the welding operation and cost of welding works involved. Thus, in contradistinction to argon-arc welding carried out at the rate of 14 to 25 m./hr., the most advantageous rates of welding to be adopted with the automatic welding under flux are within a range of 40 to 60 m./hr. This, however, does not limit at all the possibility of increasing the rate of welding.

The possibility of using a relatively high density of welding current about 60 to 80 amp./mm.² with the deposition rate being equal to 12 to 15 grams per amp. hr. allows the welding to be effected from one side of butt oints with an edge thickness up to 8 mm. per pass and butt welding without bevelling of the edges on both sides with the sheet metal thickness amounting to as much as 9 to 16 mm. For welding joints gauging more than 16 mm., it is expedient to bevel the edges at the opening angle of 90°.

As an example, given hereinbelow are conditions of welding a butt joint with an edge thickness up to 12 mm.; the welding process is effected from two sides.
Rate of welding, m./hr.—50
Diameter of welding wire, mm.—3
Welding current, amp.—430–460
Welding arc voltage, v.—34–36

What is claimed is:
1. A flux for welding titanium and alloys thereof, said flux consisting essentially of at least 77.5% by weight of $CaF_2$, 0.5 to 1.5% by weight of NaF and the balance being $BaCl_2$ or a mixture of $BaCl_2$ and NaCl.
2. A flux according to claim 1, wherein the $CaF_2$ constitutes 77.5 to 94.5% by weight.
3. A flux according to claim 1, wherein the balance is 5 to 21% by weight of $BaCl_2$.
4. A flux according to claim 1, wherein the balance is 5 to 21% by weight of $BaCl_2$ and 1.0 to 5.0% by weight of NaCl.

References Cited

UNITED STATES PATENTS

| 648,831 | 5/1900 | Bates | 148—26 |
| 1,968,984 | 12/1931 | Binder | 148—26 |
| 2,368,280 | 1/1945 | Wilson et al. | 148—26 |
| 2,470,763 | 5/1949 | Doyle | 148—26 |
| 3,272,667 | 9/1966 | Siegle et al. | 148—26 |
| 3,309,496 | 3/1967 | Rosenberg | 148—26 |
| 2,507,751 | 5/1950 | Bennet | 148—26 |

L. DEWAYNE RUTLEDGE, Primary Examiner

W. W. STALLARD, Assistant Examiner